US009997191B2

(12) United States Patent
Imai et al.

(10) Patent No.: US 9,997,191 B2
(45) Date of Patent: *Jun. 12, 2018

(54) MOVING CARTRIDGE BETWEEN LIBRARY STRINGS

(71) Applicant: International Business Machines Corporation, Armonk, NY (US)

(72) Inventors: Naoki Imai, Tokyo (JP); Takamasa Hirata, Tokyo (JP); Masanori Kamiya, Tokyo (JP); Norie Iwasaki, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/141,035

(22) Filed: Apr. 28, 2016

(65) Prior Publication Data

US 2016/0240221 A1 Aug. 18, 2016

Related U.S. Application Data

(63) Continuation of application No. 13/947,093, filed on Jul. 21, 2013, now Pat. No. 9,334,117.

(30) Foreign Application Priority Data

Jul. 30, 2012 (JP) ................ 2012-168176

(51) Int. Cl.
*G11B 17/22* (2006.01)
*G11B 15/68* (2006.01)
*B65G 1/137* (2006.01)

(52) U.S. Cl.
CPC .......... *G11B 15/6885* (2013.01); *B65G 1/137* (2013.01); *B65G 1/1373* (2013.01); *G11B 15/689* (2013.01); *G11B 17/228* (2013.01)

(58) Field of Classification Search
CPC .... G11B 17/228; G11B 15/689; B65G 1/137; B65G 1/1373; B65G 1/1378
See application file for complete search history.

(56) References Cited

U.S. PATENT DOCUMENTS 4,945,428 A 7/1990 Waldo ............................. 360/71
5,418,971 A 5/1995 Carlson ....................... 360/92.1
(Continued)

FOREIGN PATENT DOCUMENTS

JP 08-030405 A 2/1996
JP 08-227548 A 9/1996

*Primary Examiner* — Anna Momper
*Assistant Examiner* — Ashley Romano
(74) *Attorney, Agent, or Firm* — Ido Tuchman; Randall J. Bluestone

(57) ABSTRACT

A library manager to determine a relay-point library string when a particular cartridge (specific cartridge) is moved to an empty drive (target drive) for mounting. A method for determining a relay-point library string includes: receiving a command to mount a cartridge in a library string located on one side of the relay-point library string; searching for the target drive among library strings, and finding the target drive in a library string on the other side of an interposed relay-point library string relative to the library string in which the specific cartridge is located; selecting a relay-point library string based on predetermined conditions to move the specific cartridge using shuttle connections to the found target drive; and searching to determine whether or there is a newly available drive in a relay-point library string other than the selected relay-point library string before the selected cartridge reaches the selected relay-point library string.

6 Claims, 8 Drawing Sheets

(56) References Cited

U.S. PATENT DOCUMENTS

| | | | |
|---|---|---|---|
| 5,522,090 A | 5/1996 | Tanaka | 710/74 |
| 5,613,154 A | 3/1997 | Burke | 360/69 |
| 5,646,918 A | 7/1997 | Dimitri | 369/30.31 |
| 5,740,061 A | 4/1998 | Dewey | 414/273 |
| 6,338,006 B1 | 1/2002 | Jesionowski | 700/214 |
| 6,425,059 B1 | 7/2002 | Basham | 711/153 |
| 6,480,905 B1 | 11/2002 | Jesionowski | 710/3 |
| 2012/0262811 A1 | 10/2012 | Hoelsaeter | |
| 2014/0031973 A1 | 1/2014 | Hirata et al. | |
| 2014/0136775 A1 | 5/2014 | Jesionowski | |
| 2014/0379123 A1 | 12/2014 | Hirshbain | 700/236 |

Relay Point LS Determining Method

Notes: Unique Configuration of Shuttle Complex (see FIG. 4)
- There is a plurality of library strings LS1, LS2, LS3, LS4 in the Z direction.
- It is possible to move a cartridge between LS at both ends using two shuttle connections SC1, SC2.
- A specific cartridge is moved via relay points LS2 and LS3 to the target drive at terminal LS4.

FIG. 06

Example 1-1: Same Number of Drives at Each LS (Same Availability for Each Drive)

Notes: The specific cartridge is at LS0, and the target drive is at LS6. There is no direct shuttle connection, and two shuttle connections (SC1 and SC2) have to be used.

(a) Example 1-1: Connection of Each LS Using Two SC

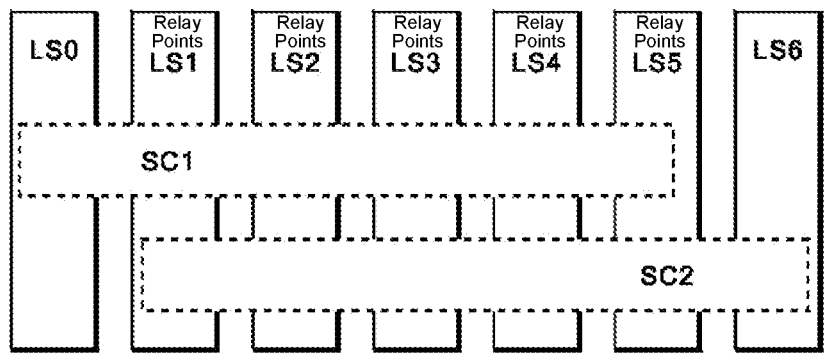

(b) Example 1-1: Average Transport Times From Selected Relay Point LS3 to LS1, LS2, L24 and LS5, Excluding LS6 Which Includes Target Drive

| Relay Points: | LS1 | LS2 | LS3 | LS4 | LS5 |
|---|---|---|---|---|---|
| A | 12.5 seconds | 8.75 seconds | 7.5 seconds | 8.75 seconds | 12.5 seconds |

FIG. 07

Example 1-2: Same Number of Drives at Each LS (Same Availability for Each Drive)

| Relay Points LS1-5 / Evaluation No. (1-8) | LS1 | LS2 | LS3 | LS4 | LS5 |
|---|---|---|---|---|---|
| 1 | 5 seconds | 10 seconds | 15 seconds | 20 seconds | 25 seconds |
| 2 | $12.5(1-Q(5))$ | $8.75(1-Q(10))$ | $7.25(1-Q(15))$ | $8.75(1-Q(20))$ | $12.5(1-Q(25))$ |
| 3 | $25Q(5)$ | $20Q(10)$ | $15Q(15)$ | $10Q(20)$ | $5Q(25)$ |
| 4 | $17.5+12.5Q(5)$ | $18.75+11.25Q(10)$ | $22.5+7.25Q(15)$ | $28.75+1.25Q(20)$ | $37.5-7.5Q(25)$ |
| 5 | $17.5+12.5q$ | $18.75+5.625q$ | $22.5+2.42q$ | $28.75+0.313q$ | $37.7-1.5q$ |
| 6 | 18.5 | 19.31 | 22.74 | 28.78 | 37.55 |
| 7 | 23.75 | 21.56 | 23.71 | 28.91 | 36.95 |
| 8 | 28.75 | 23.81 | 24.68 | 29.03 | 36.35 |

FIG. 08   Example 2: Different Number of Drives at Each LS
(Same Availability for Each Drive)
(a) Example 2-1
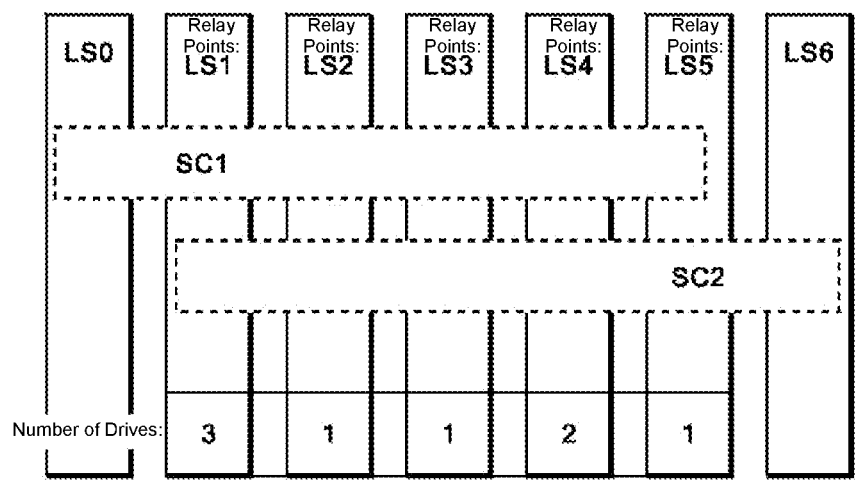
(b) Example 2-3
| Relay Points LS | LS1 | LS2 | LS3 | LS4 | LS5 |
|---|---|---|---|---|---|
| Number of Drives | 3 | 1 | 1 | 2 | 1 |
| Transport Times From LS0 to Each Relay Point | 1 | 2 | 5 | 10 | 11 |
| Number of Empty drives Anticipated | 3/10 | 2/10 | 5/10 | 20/10 | 11/10 |

MOVING CARTRIDGE BETWEEN LIBRARY STRINGS

CROSS-REFERENCE TO RELATED APPLICATIONS

This application is a continuation application claiming priority under 35 U.S.C. § 120 to U.S. patent application Ser. No. 13/947,093 filed Jul. 21, 2013, which claims priority under 35 U.S.C. § 119 to Japanese Patent Application No. 2012-168176 filed Jul. 30, 2012, the entire text of these priority documents is specifically incorporated by reference herein.

BACKGROUND

The present invention relates to a method for moving cartridges between library strings. More specifically, the present invention relates to a method for selecting a relay-point library string to execute cartridge mounting requests more efficiently when a plurality of library strings (LS) are connected by using shuttle connections.

A shuttle complex has been proposed for libraries in which a plurality of library strings that connect a plurality of libraries with storage media such as tapes are arranged in rows. This shuttle complex is a storage library in which library strings are connected by shuttle connections (SC) (IBM System Storage TS3500, etc.). In this shuttle complex, cars are able to move within a shuttle connection and are used to move (or transport) cartridges including storage media such as tapes between library strings and to mount the tapes in a tape drive (drive) or store them in a slot within the library frame specified as the destination point.

Due to phased scale-up that uses groups of libraries with a large-scale shuttle configuration, shuttle connections directly connected to all library strings cannot be guaranteed. There are shuttle complexes in which a cartridge cannot be transported in response to a mounting request except via two or more shuttle connections and a library string serving as a relay point (relay-point library string). When there are shuttle connections that do not directly connect two library strings, the selection of a relay-point library string can affect the performance of writing and reading data on a cartridge.

In a shuttle complex by using two or more shuttle connections, the transport of cartridges via the shuttles takes more time than moving a cartridge within a tape library. When a cartridge is moved via a relay point, the random selection of a relay-point library string is not ideal from the standpoint of performance when moving cartridges.

BRIEF SUMMARY

An aspect of the present invention is for shuttle connection configurations in which a specific cartridge has to be transported from the library string that is located to the library string with the target drive by using two or more shuttle connections SC. When the cartridge has reached the relay point, the availability of a drive in a library string that is connected to the currently used shuttle connection is checked again. If there is a tape library string with an available drive closer than the library string set as the initial destination, the cartridge is transported to the closer library string. A relay-point library string is selected among a plurality of relay points in order to improve transport efficiency.

Another aspect of the present invention is to move cartridges between library strings more efficiently and in less time in a library shuttle complex by using two or more shuttle connections.

Another aspect of the present invention is to provide a shuttle complex system that has a plurality of library strings connected by (1) at least two shuttle connections (SC), (2) the shuttle connections moving a cartridge including a storage medium between library strings via at least two relay-point library strings (relay-point library string) among the library strings by using a movable car, (3) a method for determining a relay-point library string when a library manager moves a particular cartridge (specific cartridge) to an empty drive (target drive) for mounting. This method for determining a relay-point library string includes the steps for: (a) receiving a command from an application to mount a specific cartridge in a library string located on one side of the relay-point library string; (b) searching the target drive for mounting the specific cartridge among the plurality of library strings, and finding the target drive in a library string on the other side of an interposed relay-point library string relative to the library string in which the specific cartridge is located; (c) selecting one of a plurality of relay-point library strings on the basis of predetermined conditions to move the specific cartridge using at least two shuttle connections SC to the found target drive; and (d) searching to determine whether or not there is a newly available drive in a relay-point library string other than the selected relay-point library string before the selected cartridge reaches the selected relay-point library string (selected relay-point library string).

In this method for determining a relay-point library string, the step for searching a newly available drive (d) further includes the step for moving the specific cartridge to the library string with a newly available drive instead of to the target drive when a drive becomes newly available.

In this method for determining a relay-point library string, the step for searching a newly available drive (d) further includes the step for moving the specific cartridge to the library string with the initial target drive when a drive does not become newly available.

In this method for determining a relay-point library string, the step for selecting a relay-point library string (c) selects one of a plurality of relay-point library strings on the basis of predetermined conditions taking into account the possibility that a drive may become newly available from the selected relay-point library string in a library string other than the library string of the target drive when the library strings have the same number of tape drives.

In this method for determining a relay-point library string, the step for selecting a relay-point library string (c) selects one of a plurality of relay-point library strings on the basis of the average transport times from the selected relay-point library string to library strings other than the library string with the target drive.

In this method for determining a relay-point library string, the step for selecting a relay-point library string (c) selects one of a plurality of relay-point library strings on the basis of the anticipated required time that is defined as the product of the average transport time from the selected relay-point library string to library strings other than the library string with the target drive, and the probability of a drive becoming available in a plurality of library strings other than the library string with the target drive before the specific cartridge arrives at the relay point candidate.

In this method for determining a relay-point library string, the step for selecting a relay-point library string (c) selects, as a relay point, the library string having the shortest average transport time or anticipated time required from the selected relay-point library string and a library string other than the library string of the target drive.

In this method for determining a relay-point library string, the step for selecting a relay-point library string (c) selects one library string with the largest number of drives among the relay-point library string candidates when each library string has a different number of tape drives.

Another aspect of the present invention provides a shuttle complex system that has a plurality of library strings connected by (1) at least two shuttle connections, (2) the shuttle connections moving a cartridge including a storage medium between library strings via at least two relay-point library strings among the library strings by using a movable car, and (3) the shuttle complex system determining a relay-point library string when a library manager moves a particular cartridge (specific cartridge) to an empty drive (target drive) for mounting. This shuttle complex system executes the following steps:

(a) Receive a command from an application to mount a specific cartridge in a library string that is located on one side of the relay-point library string (b) Search for the target drive to mount the specific cartridge among the plurality of library strings, and find the target drive in a library string on the other side of an interposed relay-point library string relative to the library string in which the specific cartridge is located (c) Select one of a plurality of relay-point library strings on the basis of predetermined conditions to move the specific cartridge using at least two shuttle connections to the target drive that is found (d) Search to determine whether or not there is a newly available drive in a relay-point library string other than the selected relay-point library string before the selected cartridge reaches the selected relay-point library string.

Another aspect of the present invention provides for a shuttle complex system that has a plurality of library strings connected by:

(1) At least two shuttle connections (2) The shuttle connections moving a cartridge including a storage medium between library strings via at least two relay-point library strings among the library strings that uses a movable car (3) a program for determining a relay-point library string when a library manager moves a particular cartridge (specific cartridge) to an empty drive (target drive) for mounting. This program executes the following steps in a computer:

(a) Receive a command from an application to mount a specific cartridge in a library string that is located on one side of the relay-point library string (b) Search for the target drive to mount the specific cartridge among the plurality of library strings, and find the target drive in a library string on the other side of an interposed relay-point library string relative to the library string in which the specific cartridge is located (c) Select one of a plurality of relay-point library strings on the basis of predetermined conditions to move the specific cartridge by using at least two shuttle connections to the target drive found (d) Search to determine whether or not there is a newly available drive in a relay-point library string other than the selected relay-point library string before the selected cartridge reaches the selected relay-point library string.

By applying the methods described above allows a specific cartridge to be mounted in an empty drive in less time when the shuttle complex uses two or more shuttle connections.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 6 shows example 1-1 of determining a relay-point library string in the present invention.

FIG. 7 is a table of evaluation values in example 1-2 of determining a relay-point library string in the present invention.

FIG. 8 shows examples 2-1 and 2-2 of determining a relay-point library string in the present invention.

DETAILED DESCRIPTION

Figure 1:
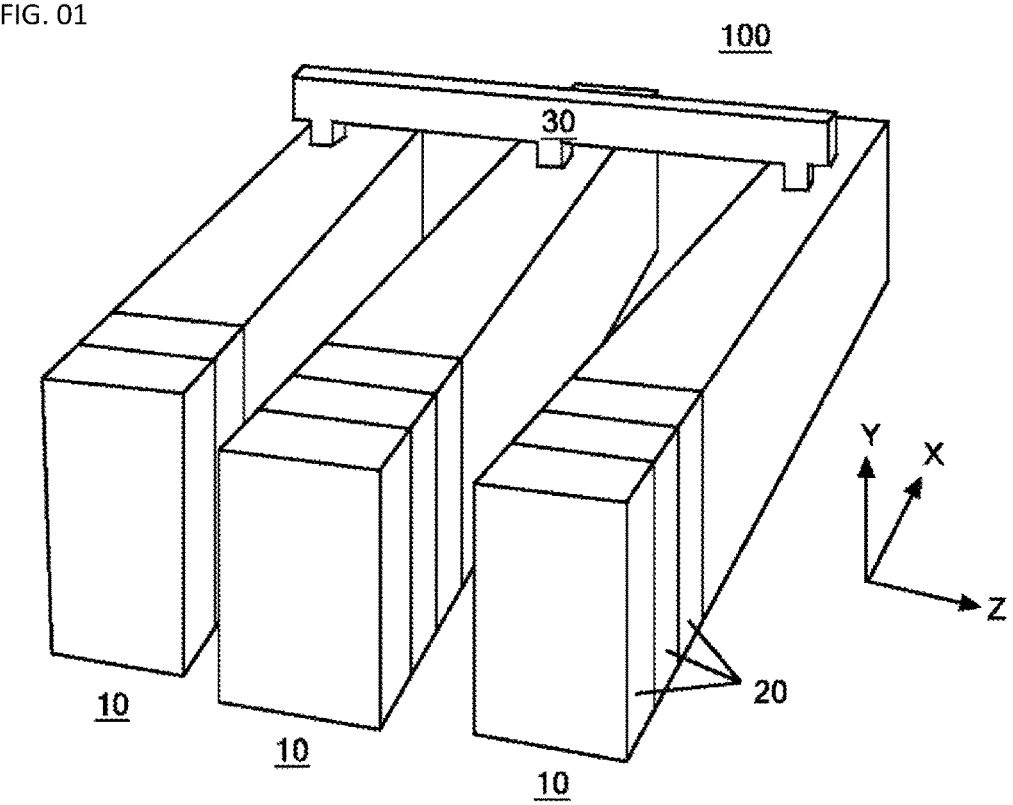
FIG. 1 shows the external appearance of the shuttle complex of the present invention.

The following is an explanation of embodiments (examples) of the present invention for selecting (determining) a relay-point library string. FIG. 1 is a diagram that shows the external appearance of the shuttle complex of the present invention. In FIG. 1, the shuttle complex 100 includes three library string 10s, and three shuttle connection 30s arranged on top of the three library string 10s. Each of the library string 10 includes a plurality of library frames 20 connected in rows in the X direction.

The number of library string 10 is not limited to three. Any number of library strings can be chosen. The number of shuttle connection 30 is also not limited to three. Any number can be chosen on the basis of the length of library string 10s in the X direction. The length of shuttle connection 30s in the Z direction can be extended as the number of library string 10 is increased. Cars which move along rails are arranged inside shuttle connection 30s, and cartridges are moved inside and outside of library string 10s as the car stops at each position in library string 10.

As shown in FIG. 1, in the shuttle technology that has recently emerged, scalability in the Z direction has been added to existing scalability in the X direction. A single car is installed in each shuttle connection to transport cartridges. Cartridges can be moved directly between library strings. For example, when all of the drives in a library string are being used, a shuttle connection can be used to transport a cartridge from one library string to another with an available drive and mount the cartridge in that drive.

Figure 2:
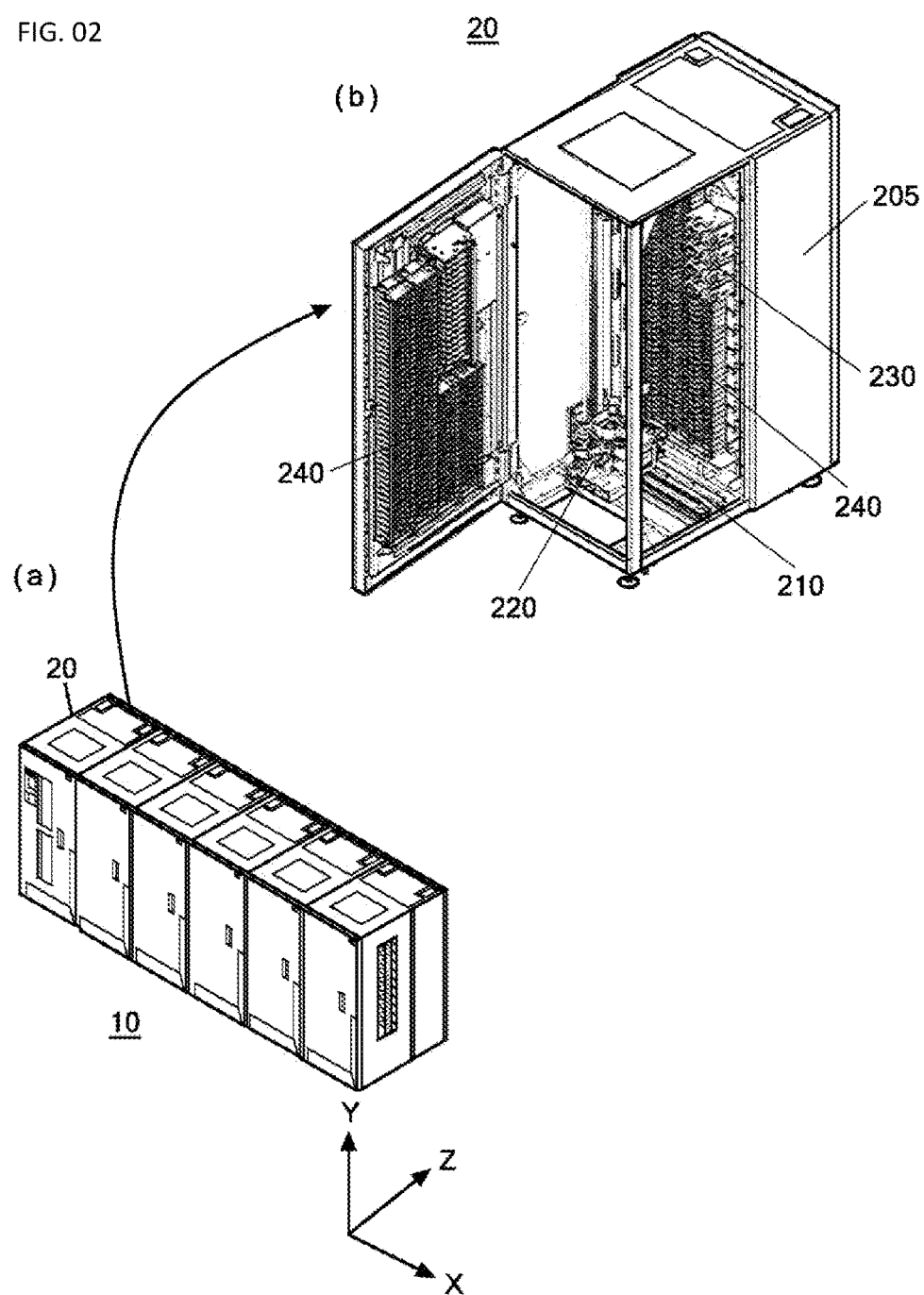
FIG. 2 shows an example of a library frame 20 constituting a library string 10 of the present invention.

FIG. 2 shows an example of library frame 20s constituting a library string 10 of the present invention. FIG. 2 (a) is an example of a library string 10. The library string 10 includes six connected library frames 20. FIG. 2 (b) is an enlarged view of a single library frame 20. The library frame 20 includes, in a housing 205, a robotic arm 220 able to move over a rail 210 in the X direction and over a rail in the Y direction (not shown), a plurality of drives 230 for mounting cartridges include storage media and retrieving data, and a plurality of slots 240 able to accommodate cartridges.

Rail 210 in the X direction is connected to the rail inside the adjacent library frames 20, and the robotic arm 220 is able to move through six connected library frames 20. The robotic arm 220 can hold a cartridge, move at high speed along the rail, and mount the cartridge in the specified drive 230 or slot 240. Any number of drive 230 can be chosen and arranged according to the type of storage medium (magnetic tape, magneto-optical medium, etc.) and the type of cartridge (magnetic tape 3592, LTO, etc.).

Figure 3:
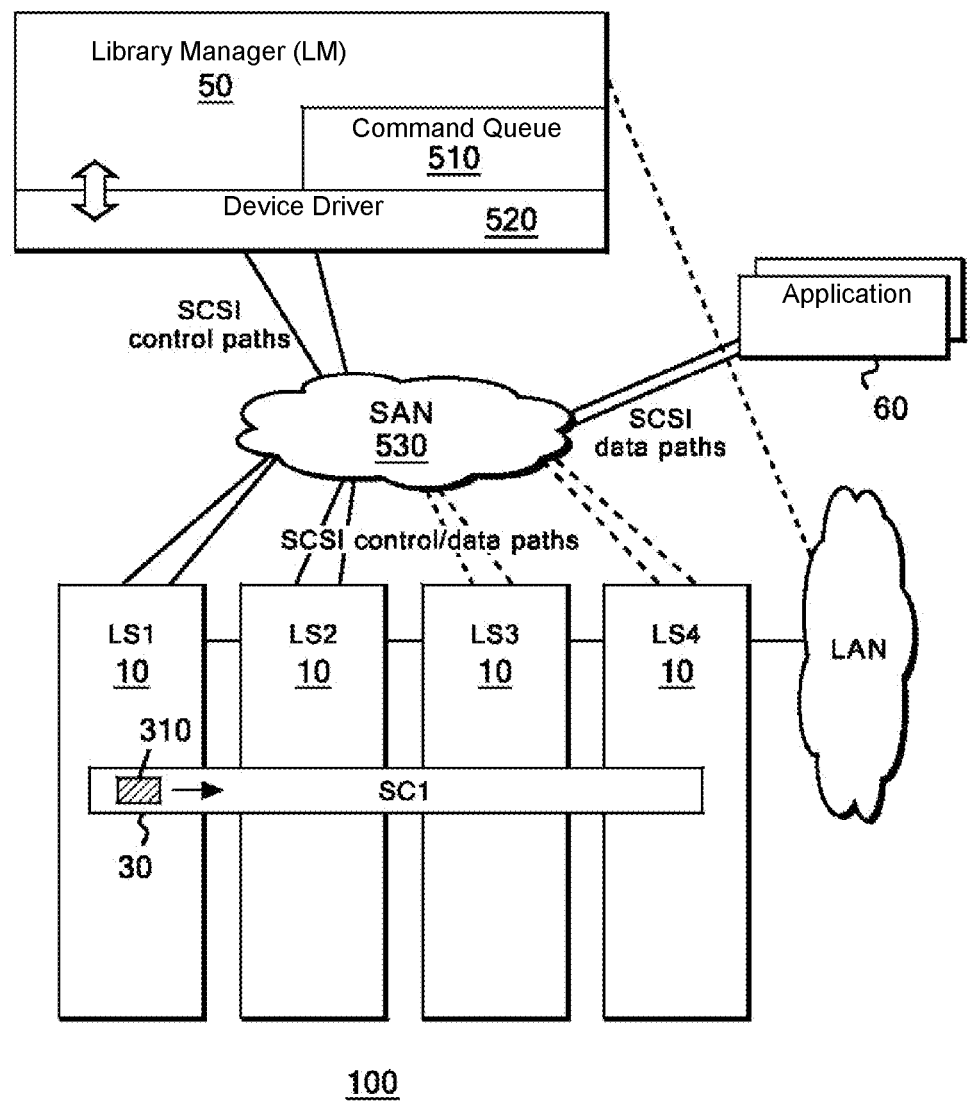
FIG. 3 shows a configuration example of a system including a shuttle complex 100 of the present invention.

FIG. 3 is a diagram showing a configuration example of a system including a shuttle complex 100 of the present invention. The shuttle complex 100 includes four library strings 10 (LS1-LS4). A shuttle connection 30 (SC1) is connected to each library string. There can be more than one shuttle connection 30, for example, two or more. A car 310 is provided which moves inside the shuttle connection 30. The library strings 10 and the shuttle connection 30 are controlled by a library manager 50 via a storage area network (SAN) 530. The library strings 10 exchange (read/write) data with an application 60 via the SAN 530. The application 60 is dedicated software used to mount library cartridges into drives and exchange data in libraries. An example is IBM Tivoli Storage Manager.

The library manager 50 is a single software package performing virtual central control of the drives 230 and cartridges between the application 60 and each library string. An example of a library manager 50 is IBM Tape System Library Manager (TSLM). The library manager 50 temporarily stores commands from the application 60 in a command queue 510, while controlling device drivers, and outputting, for example, a SCSI command for each command to the library strings.

The application 60 may issue a request to a library manager 50 when a library including a cartridge is to be used. Alternatively, the library manager 50 may manage and allocate the actual cartridges. In this way, it is easier to share cartridges in a library. Because the library manager 50 manages all operations, each application does not have to be aware of the changes each and every time the configuration is changed to add or remove libraries.

Figure 4:
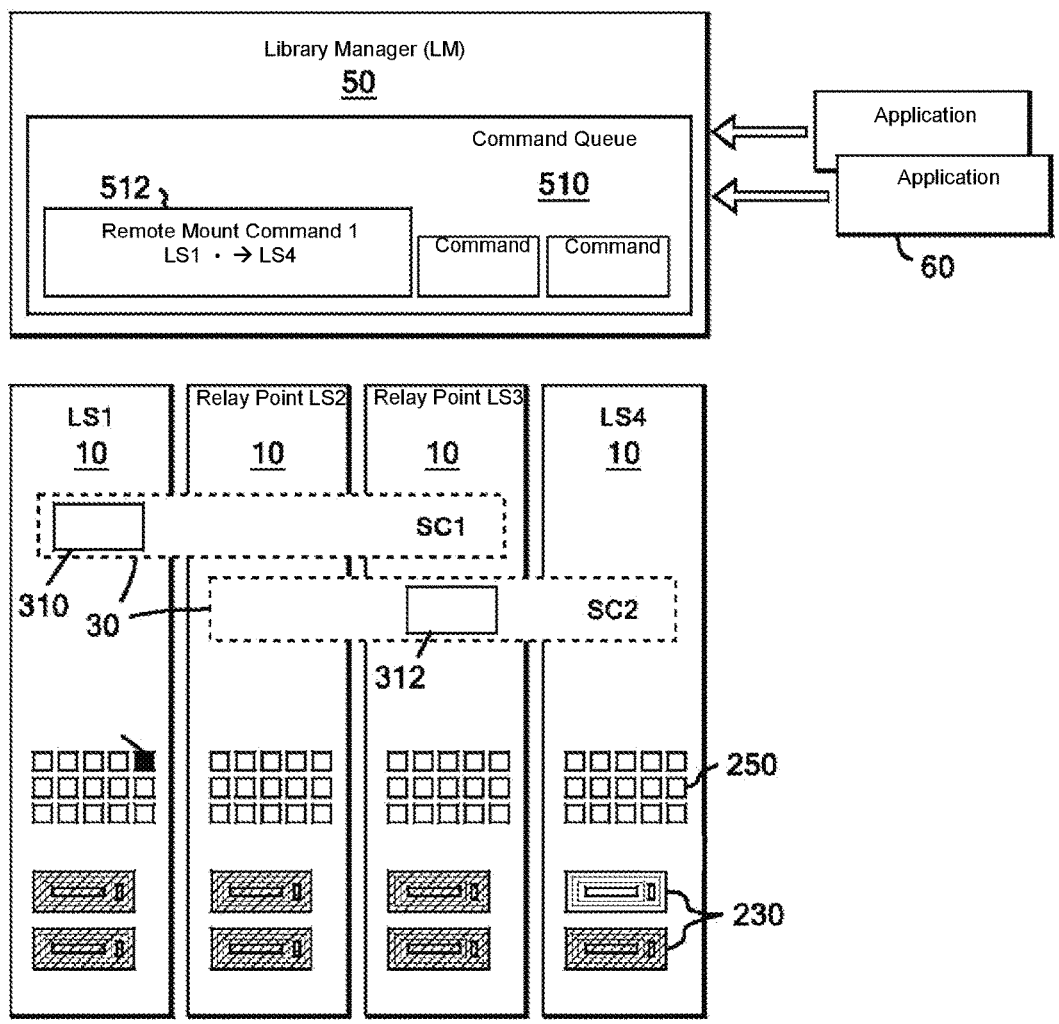
FIG. 4 shows a typical library system composed of a plurality of library strings and a plurality of shuttle connections to which the relay point determining the method of the present invention has been applied.

FIG. 4 shows a library system with a plurality of library strings LS and a plurality of shuttle connections SC which is the type of library system that typically uses the relay point determining method of the present invention. In this library system, at least two library strings LS (relay-point library strings LS) are connected using at least two shuttle connections (SC). This system is a shuttle complex system in which a cartridge including a storage medium is moved using a movable car over a storage connection SC via one of two or more relay-point library strings LS. In this system, a method is provided which allows a library manager (LM) to determine the relay-point library string when a specific cartridge is moved to be mounted in an empty drive (the target drive).

Any method may be used to connect the shuttle connections (SC) to the library strings. For example, when there are four library strings LS1, LS2, LS3, LS4, the two shuttle connections SC1, SC2 do not have to be connected to all of the library strings LS1-LS4. When an existing library system is expanded or enlarged, it does not have to be configured so that a single shuttle connection SC enables movement of a cartridge to all of the library strings LS. Two shuttle connections SC can be installed so that shuttle connection SC1 connects library strings LS1-LS3, and shuttle connection SC2 connects library strings LS2-LS4. In order to move a cartridge from library string1 to library string4 in this configuration, shuttle connection SC1 is used to move a cartridge in LS1 to relay-point library string2 or LS3. Then, shuttle connection SC2 is used to transport the cartridge from library string2 or library string3 used as a relay-point library string.

In FIG. 4, the library manager (LM) 50 receives remote mounting command 1 (LS1→LS4) 512 as a command from an application 60, and this command is placed in the command queue 510. Commands in the command queue 510 are executed in the order received. Usually, when remote mounting command 1 (LS1→LS4) 512 is executed, the library manager LM searches all library strings LS for an empty drive (available drive). The cartridge in the mounting request (the specific cartridge) is then moved to the library string with the drive available for mounting (target drive).

Car 1 (310) and car 2 (312) in the shuttle connections 30 are positioned, respectively, in LS1 and LS3 among the library strings 10. The drives 230 are one or more drives in each library string 10 and, more specifically, in each library frame 20. Here, reference sign 250 refers to the cartridges accommodated in slots 240 inside library strings 10 and, more specifically, inside library frames 20. There is a plurality of cartridges.

The application 60 requests the mounting of a specific cartridge CA in an available drive. Because other applications have also requested the use of these drives, there are no drives available in the library string1 itself. The library manager LM 50 searches all library strings LS for an available drive, that is, library strings LS1, LS2, LS3 and LS4. Here, LM 50 finds an available drive in library string4, which is on the opposite side of library string1 including the specific cartridge CA with respect to relay-point library strings LS2 and LS3.

In this embodiment of the present invention, the library string including the cartridge is a library string on one side of the relay-point library strings LS (LS2, LS3), and the library string including the target drive is on the other side. When the specific cartridge in library string1 is moved to the available drive in library string4, there is no significant difference in terms of distance via relay-point library string2 and relay-point library string3. However, a drive may become available in another library string by the time the selected relay-point library string is reached. Sometimes, moving the cartridge from the relay-point library string to the empty drive that has become newly available (newly available drive) would take less time than moving the cartridge to the library string with the original target drive. Therefore, the present invention selects a relay-point library string while taking into account the possibility that a drive may become available in another library string during transit.

In a configuration with a plurality of tape library strings, when a cartridge is moved, it is moved directly via a single shuttle connection. However, when an existing storage system is to be maintained while increasing the number of library strings in stages, the shuttle connection configuration shown in FIG. 4 is not uncommon. The present invention considers the possibility of moving a specific cartridge to the library string with the target drive via any relay-point library string.

Figure 5:
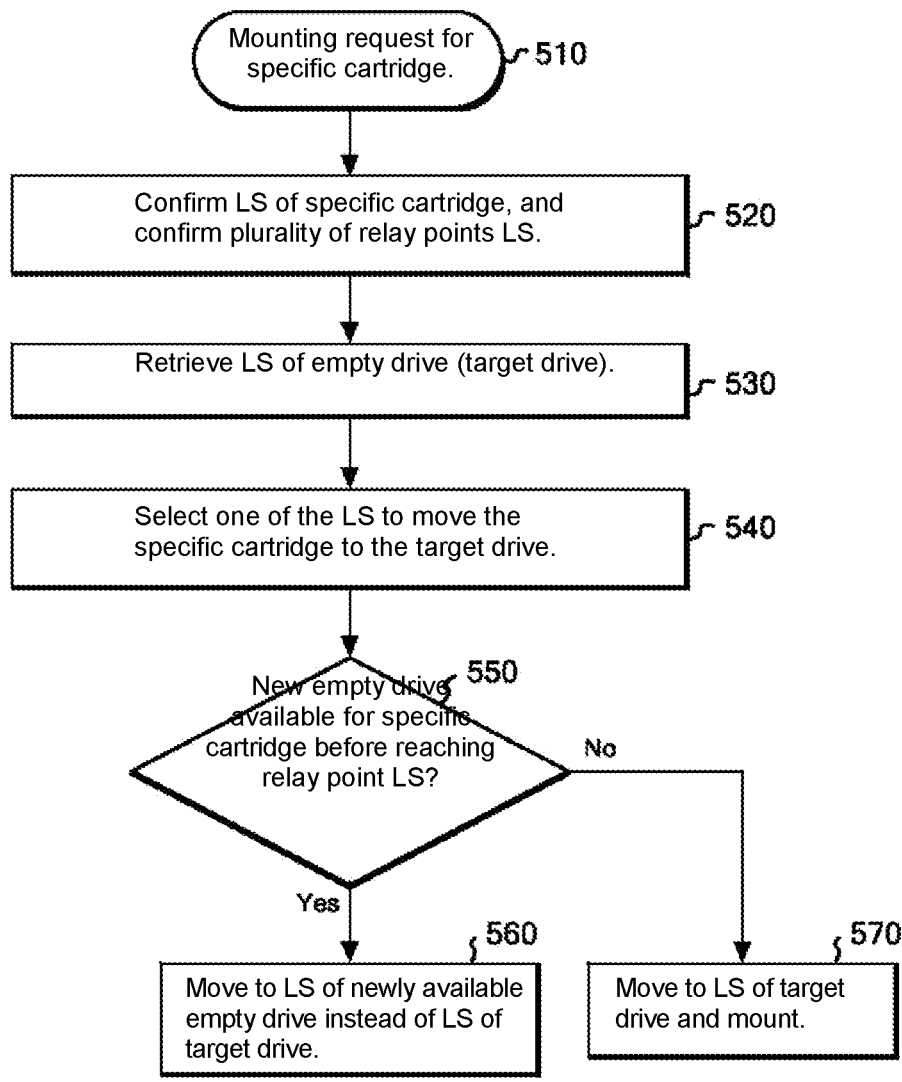
FIG. 5 shows a flowchart for selecting a relay-point library string when a specific cartridge is moved to an empty drive that is available for mounting.

FIG. 5 shows a flowchart for selecting a relay point LS when a specific cartridge is moved to an empty drive available for mounting. The following is an explanation of a method for selecting one of a plurality of relay-point library string candidates when the library manager (LM) 50 in a typical shuttle complex configuration moves a specific cartridge to a drive available for mounting (target drive).

(510) A command is received from an application to mount a specific cartridge in a library string located on one side of the relay-point library string.

(520) The library manager LM 50 verifies the library string in which the specific cartridge is located. It also verifies the presence of a plurality of relay-point library strings LS. For example, in the shuttle complex configuration shown in FIG. 4, the specific cartridge can be verified as being located in library string1 on one side of a relay-point library string.

(530) The library manager LM 50 searches a plurality of library strings LS for the target drive for mounting the specific cartridge. The library string in which the target drive is located is on the other side of an interposing relay-point library string with respect to the library string in which the specific cartridge is located.

(540) The specific cartridge is moved to the target drive using at least two shuttle connections SC. When moved, one of a plurality of relay-point library string is selected on the basis of the specific conditions explained in an example below.

(550) The library manager searches for a newly available drive in a library string other than the selected relay-point library string (selected relay-point LS) before the selected cartridge reaches the selected relay-point library string.

(560) When searching for a newly available drive (550), the specific cartridge is moved to a library string with a newly available drive instead of to the target drive when a drive has become newly available in a library string other than the selected relay-point library string. The specific drive is then mounted in the newly available drive.

(570) When searching for a newly available drive (550), the specific cartridge is moved to the library string with the initial target drive when a drive does not become newly available in a library string other than the selected relay-point library string. The specific drive is then mounted in the target drive.

FIG. 6 (*a*) is a schematic diagram of a shuttle complex configuration in which there are seven library strings LS, two shuttle connections SC, and the possibility of moving between library strings LS via at least one of five relay-point library strings LS. The following is an explanation, with reference to this drawing, of the relay-point library string determining method in an example of the present invention. The library manager LM 50 determines that the cartridge in a mounting request from an application (the specific cartridge) is located in library string 0. When the mounting request is received, the library manager LM verifies that there is an empty drive (target drive) located in library string 6. There is no shuttle connection (SC) that connects library string 0 directly to library string 6. In this shuttle complex, two shuttle connections SC 1, SC 2 have to be used to move the cartridge between library strings LS via a relay-point. When the specific cartridge located in library string 0 is moved to the target drive, one of relay-point library strings LS 1 through LS 5 is selected to connect shuttle connection SC 1 to shuttle connection SC 2. When moving the specific cartridge, it has to be transferred from shuttle connection SC 1 to shuttle connection SC 2 via a relay-point library string. When transporting cartridges using shuttle connections, the destination library string is determined when the cartridge departs. The relay-point library string cannot be changed while the specific cartridge is being transported. However, when the specific cartridge arrives at the relay-point library string to change shuttle connections SC, there is an opportunity to choose another destination. There may be a newly available drive in a library string which has a shorter transport time than library string 6 including the target drive. If a tape drive becomes available in a library string that is closer to the relay-point library string, that tape drive is secured. Moving the cartridge to the library string with the newly available drive reduces the tape mounting time. If a tape drive is available in the relay-point library string, mounting the cartridge in this available tape drive, extra transport time is eliminated, and the mounting occurs in a shorter period of time.

Example 1-1 will now be explained with reference to FIG. 6 (*a*) in which one of a plurality of relay-point library strings LS is selected. In Example 1-1, each library string has the same number of drives, and the availability of drives is equal. It takes, for example, five seconds to transport a cartridge between any two library strings (for example, between library string 0 and library string 1). When a specific cartridge in library string 0 is transported to library string 6, the transport time is 5×6=30 seconds regardless of which relay-point library string (LS 1 through LS 5) is selected. The moving time to each relay-point becomes successively greater from library string 1 to library string 5, but so does the possibility that a drive will become available in a relay point. The availability of drives in the relay points is continuously monitored. When one becomes available, it is set aside. There is no particular advantage to selecting any library string from among library string 1 through library string 5. When there is no drive available in a relay point, selection of a subsequent relay-point library string reduces the moving distance.

When library string 1 is selected as the relay point, the transport time is from 10 to 25 seconds if a drive is reserved in any library string from library string 2 to library string5 when the cartridge arrives at library string 1. The transport time would then be shorter than transporting the cartridge to library string 6 including the target drive. However, this depends on a drive becoming available at this time. If a drive has not become available, the cartridge is transported to library string 6. The average transport time from relay-point library string 1 to a library string other than the one including the target drive (LS2, LS3, LS4, LS5) is (5+10+15+20)/4=12.5 seconds.

When library string 3 is selected as the relay point, the average transport time from relay-point library string 3 to a library string other than the one including the target drive (LS1, LS2, LS4, LS5) is (5+10+5+10)/4=7.5 seconds.

When library string 4 is selected as the relay point, the average transport time from relay-point library string 4 to a library string other than the one including the target drive (LS1, LS2, LS3, LS5) is (5+5+10+15)/4=8.75 seconds.

FIG. 6 (*b*) is a table including the calculations for relay-point library strings LS 1 through LS 5 using this method. In Example 1-1, the optimum relay point is determined on the basis of the average transport times from the relay point to the library strings LS other than the one including the target drive. Here, relay-point library string 3 is selected from among relay points LS 1 through LS 5.

FIG. 7 shows the table for Example 1-2 which includes values evaluated using the present invention to determine a relay point library string. In Example, 1-2, each library string has the same number of drives, and the availability of drives is equal. It takes, for example, five seconds to transport a cartridge between any two library strings (for example, between library string 0 and library string 1). When a specific cartridge in library string 0 is transported to library string 6, the transport time is 5×6=30 regardless of which relay-point library string (LS 1 through LS 5) is selected.

The probability of not finding an available drive in any relay point is Q. The probability approaches 1 as the wait time decreases, and approaches 0 as the wait time increases. This is given as the function Q(t) of wait time t. For example, when library string 1 is selected as the relay point, the library manager may be able to secure a drive in any one of library strings LS 2 through LS 5 when the cartridge arrives at library string 1. The transport time is from 10 to 25 seconds, which is shorter than the time required to reach library string 6. However, this depends on a drive becoming available at this time. If a drive has not become available, the cartridge is transported to library string 6.

The average transport time from relay-point library string 1 to a library string other than the one including the target drive (LS2, LS3, LS4, LS5) is (5+10+15+20)/4=12.5 seconds. The anticipated time required before the cartridge can be mounted is the sum of 1 through 3 below.

1. Required time to LS 1: 5 seconds
2. Avg. transport time to LS other than one with target drive (LS2, LS3, LS4, LS5)×(1−Q (5 seconds))
3. Transport time to LS with target drive×Q (5)

When library string 3 is selected as the relay point, the average transport time from relay-point library string 3 to a library string other than the one including the target drive (LS1, LS2, LS4, LS5) is (5+10+5+10)/4=7.5 seconds. The anticipated time required before the cartridge can be mounted is the sum of 1 through 3 below.

1. Required time to LS 3: 15 seconds
2. Avg. transport time to LS other than one with target drive (LS1, LS2, LS4, LS5)×(1−Q (15 seconds))
3. Transport time to LS with target drive×Q (15)

When library string 4 is selected as the relay point, the average transport time from relay-point library string 4 to a library string other than the one including the target drive (LS1, LS2, LS3, LS5) is (5+5+10+15)/4=8.75 seconds. The anticipated time required before the cartridge can be mounted is the sum of 1 through 3 below.

1. Required time to LS 4: 20 seconds.
2. Avg. transport time to LS other than one with target drive (LS1, LS2, LS3, LS5)×(1−Q (20 seconds))
3. Transport time to LS with target drive×Q (20)

The table in FIG. 7 is a table of all of the evaluation items 1-8 for calculating the anticipated time required for all five relay-point library strings LS in this example.

The following is an explanation of the evaluation items in the table of FIG. 7.

1 is the time required to a relay point.
2 is the average transport time from the relay point to an LS other than the one with the target drive multiplied by the probability of a drive becoming available at any relay point.
3 is the time required to the target drive multiplied by the probability of a drive not becoming available at a relay point.
4 is the sum of 1, 2 and 3.
5 is Q(5), Q(10), Q(15), Q(20) and Q(25) which is the probability of a drive not becoming available at a relay point. When rewritten to be semi-proportional to the wait time t, where Q(5) is q, the Q(t) values are as follows: Q(5)=q, Q(10)=q/2, Q(15)=q/3, Q(20)=q/4, Q(25)=q/5.
6 is the minimum anticipated time required to mount the cartridge when q=0.1 and LS 1 is selected.

7 and 8 are minimum anticipated time required to mount the cartridge when LS 2 is selected and q=0.5 and q=0.9, respectively.

Because this exceeds 30 seconds in the case of library string 5, there is no advantage to waiting for a drive in a library string other than the one in which the target drive is located. The value q indicating the probability of a drive becoming available depends on the I/O access frequency of applications via the library manager LM 50.

FIG. 8 shows Example 2-1 and Example 2-2 of the present invention used to determine a relay-point library string. FIG. 8 (*a*) is a schematic view of a shuttle complex configuration in which there are seven library strings LS, two shuttle connections SC, and the possibility of moving between library strings LS via at least one of five relay-point library strings LS. In Examples 2-1 and 2-2, each library string has a different number of drives. However, the availability of each drive is the same. In these examples, the number of drives varies, but there is no difference in the availability of each drive. When the policy is to select the library string with the greatest number of drives (LS 1 in this example) as the relay point, the probability of a drive becoming available at the relay point by the time the cartridge reaches the library string 1, thereby eliminating the need to move the cartridge to the library string with the target drive, is high.

FIG. 8 (*b*) is a table of the anticipated number of available drives which takes into account the different number of drives in each library string and the availability of each drive. While the cartridge is being moved to the relay point, the availability of a drive at the relay point is continuously monitored. When one becomes available, it is set aside. In such a system, selecting a library string with a large number of drives as the relay point is not necessarily optimal. In the table shown in FIG. 8 (*b*), drive availability is ¹⁄₁₀ (a drive is not in use only one out of every ten minutes), and the anticipated number of available drives (anticipated number of empty drives) is the wait time for a drive multiplied by drive availability. When relay point library string 4 is selected, which has the maximum anticipated number of empty drives, the possibility of swift mounting in an empty drive increases, and data reading and writing performance improves.

As explained above, a specific cartridge can be mounted in an available drive in a shorter period of time in a shuttle complex using two or more shuttle connections.

Embodiments of the present invention were explained with reference to the drawings. However, the present invention is not limited to these embodiments. The present invention can be embodied in a manner that includes various improvements, modifications and variations on the basis of the knowledge of those skilled in the art without departing from the scope of the invention.

REFERENCE SIGNS LIST

10: Library String
20: Library Frame
30: Shuttle Connection
50: Library Manager
60: Application
220: Robotic Arm
230: Drive
240: Slot
310, 312: Car
100: Shuttle Complex While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadcast interpretation so as to encompass all such modifications and equivalent structures and functions.

What is claimed is:

1. A method for determining a relay-point library string when a library manager moves a particular cartridge (specific cartridge) to an empty drive (target drive) for mounting, the method comprising:
   (a) receiving a command from an application to mount a specific cartridge in a library string located on one side of the relay-point library string;
   (b) searching for the target drive for mounting the specific cartridge among the plurality of library strings LS, and finding the target drive in a library string on an other side of an interposed relay-point library string relative to the library string in which the specific cartridge is located;
   (c) selecting a relay-point library string of a plurality of relay-point library strings LS on the basis of predetermined conditions to move the specific cartridge using at least two shuttle connections SC to the target drive; and
   (d) searching to determine whether or not there is a newly available drive in the relay-point library string other than the selected relay-point library string before the selected cartridge reaches the selected relay-point library string (selected relay-point LS); and
   (e) moving the specific cartridge to the newly available drive instead of to the target drive when the newly available drive becomes available before the selected cartridge reaches the selected relay-point library string.

2. The method of claim 1, wherein searching for the newly available drive (d) further comprises moving the specific cartridge to the library string with the initial target drive when a drive does not become newly available.

3. The method of claim 2, wherein selecting the relay-point library string (c) selects one of the plurality of relay-point library strings LS on the basis of predetermined conditions taking into account the possibility that a drive may become newly available from the selected relay-point library string in a library string other than the library string of the target drive when the library strings have the same number of tape drives.

4. The method of claim 3, wherein selecting the relay-point library string (c) selects one of the plurality of relay-point library strings LS on the basis of average transport times from the selected relay-point library string to library strings LS other than the library string with the target drive.

5. The method of claim 4, wherein selecting the relay-point library string (c) selects one of the plurality of relay-point library strings LS on the basis of an anticipated time required defined as the product of the average transport time from the selected relay-point library string to library strings LS other than the library string with the target drive, and the probability of a drive becoming available in a plurality of library strings LS other than the library string of the target drive before the specific cartridge arrives at the relay point candidate.

6. The method of claim 4, wherein selecting the relay-point library string (c) selects, as a relay point, the library string having a shortest average transport time or anticipated time required from the selected relay-point library string and a library string other than the library string of the target drive.

* * * * *